United States Patent
Murata et al.

(10) Patent No.: US 11,240,074 B2
(45) Date of Patent: Feb. 1, 2022

(54) COMMUNICATION DEVICE AND COMMUNICATION METHOD

(71) Applicant: MegaChips Corporation, Osaka (JP)

(72) Inventors: Shinichi Murata, Osaka (JP); Taiji Kondo, Chiba (JP); Yoshiki Yokoyama, Osaka (JP)

(73) Assignee: MEGACHIPS CORPORATION, Osaka (JP)

(*) Notice: Subject to any disclaimer, the term of this patent is extended or adjusted under 35 U.S.C. 154(b) by 0 days.

(21) Appl. No.: 17/184,606

(22) Filed: Feb. 25, 2021

(65) Prior Publication Data

US 2021/0273830 A1    Sep. 2, 2021

(30) Foreign Application Priority Data

Feb. 27, 2020    (JP) .............................. JP2020-031553

(51) Int. Cl.
*H04L 25/03*    (2006.01)
*H04L 27/26*    (2006.01)

(52) U.S. Cl.
CPC .... *H04L 25/03159* (2013.01); *H04L 27/2647* (2013.01); *H04L 2025/03624* (2013.01)

(58) Field of Classification Search
CPC ........... H04L 25/03159; H04L 27/2647; H04L 2025/03624
See application file for complete search history.

(56) References Cited

U.S. PATENT DOCUMENTS

| | | | |
|---|---|---|---|
| 6,104,766 A * | 8/2000 | Coker | G11B 20/10175 375/341 |
| 8,095,855 B2 * | 1/2012 | Tan | G06F 11/0727 714/780 |
| 8,165,007 B2 * | 4/2012 | Honma | G11B 20/10509 369/124.05 |
| 10,069,653 B1 * | 9/2018 | Derras | H04L 25/0305 |
| 2005/0063276 A1 * | 3/2005 | Ogura | G11B 20/10296 369/59.22 |
| 2006/0245765 A1 * | 11/2006 | Elahmadi | H04L 25/4902 398/189 |
| 2010/0054716 A1 * | 3/2010 | Honma | G11B 20/1426 386/334 |
| 2011/0264983 A1 | 10/2011 | Yoshida et al. | |

FOREIGN PATENT DOCUMENTS

| | | |
|---|---|---|
| JP | 2006-121285 A | 5/2006 |
| JP | 2011-227970 A | 11/2011 |

* cited by examiner

*Primary Examiner* — Freshteh N Aghdam
(74) *Attorney, Agent, or Firm* — Xsensus LLP (57) ABSTRACT

A communication device includes a zero-forcing equalizer that receives a receipt signal and execute zero-forcing equalization on the receipt signal, a partial response equalizer that receives the receipt signal and execute partial response equalization on the receipt signal, a first weighted value calculator that calculates a first weighted value based on signal quality of the receipt signal output from the zero-forcing equalizer, a second weighted value calculator that calculates a second weighted value based on signal quality of the receipt signal output from the partial response equalizer, and an estimator that estimates a maximum likelihood sequence by supplying the first weighted value to state transition based on output by the zero-forcing equalizer and supplying the second weighted value to state transition based on output by the partial response equalizer.

7 Claims, 8 Drawing Sheets

| Sn-1 | Sn | Pn |
|---|---|---|
| 1 | 1 | 2 |
| | 1/3 | 4/3 |
| | -1/3 | 2/3 |
| | -1 | 0 |
| 1/3 | 1 | 4/3 |
| | 1/3 | 2/3 |
| | -1/3 | 0 |
| | -1 | -2/3 |
| -1/3 | 1 | 2/3 |
| | 1/3 | 0 |
| | -1/3 | -2/3 |
| | -1 | -4/3 |
| -1 | 1 | 0 |
| | 1/3 | -2/3 |
| | -1/3 | -4/3 |
| | -1 | -2 |

FIG. 9

FIG. 10

COMMUNICATION DEVICE AND COMMUNICATION METHOD

CROSS REFERENCE TO RELATED APPLICATION

This application claims priority to Japanese Patent Application No. 2020-031553 filed on Feb. 27, 2020, the content of which is incorporated herein by reference.

BACKGROUND

Technical Field

The present invention relates to a communication device that decodes a signal received in a communication network and a communication method used in the communication device.

Description of Related Art

Partial Response Maximum Likelihood (PRML) is used as a method of decoding a signal read from a recording medium such as an optical disc or a magnetic disc.

In the Partial Response Maximum Likelihood, it is possible to suppress noise amplification caused during equalization by executing partial response equalization that allows specific intersymbol interference.

In JP 2011-227970 A and JP 2006-121285 A, a signal is decoded by execution of two types of partial response equalization in a recording-reproducing device.

SUMMARY

It is possible to suppress noise amplification caused by equalization and lower a symbol error rate by using the Partial Response Maximum Likelihood. However, noise amplifying property of a channel varies. Even in a case where the partial response equalization is utilized, there is a further demand to lower a symbol error rate. In the field of high-speed communication technique in particular, there is a great demand to lower a symbol error rate.

An object of the present invention is to further lower a symbol error rate in a decoding method utilizing partial response equalization.

A communication device according to one aspect of the present invention includes circuitry configured to receive a receipt signal and execute zero-forcing equalization on the receipt signal, receive the receipt signal and execute partial response equalization on the receipt signal, calculate a first weighted value based on signal quality of the receipt signal on which the zero-forcing equalization has been executed, calculate a second weighted value based on signal quality of the receipt signal on which the partial response equalization has been executed, and estimate a maximum likelihood sequence by supplying the first weighted value to state transition based on output from the zero-forcing equalization and supplying the second weighted value to state transition based on output from the partial response equalization.

The zero-forcing equalization may include a procedure to be processed by a zero-forcing equalization slicer, the partial response equalization may include a procedure to be processed by a partial response equalization slicer, and the calculating a first weighted value may include calculating the first weighted value based on a signal-to-noise ratio of the zero-forcing equalization slicer, and the calculating a second weighted value may include calculating the second weighted value based on a signal-to-noise ratio of the partial response equalization slicer.

The first weighted value may have a positive correlation with the signal-to-noise ratio of the zero-forcing equalization slicer, and may have a negative correlation with a sum of the signal-to-noise ratio of the zero-forcing equalization slicer and the signal-to-noise ratio of the partial response equalization slicer, and the second weighted value may have a positive correlation with the signal-to-noise ratio of the partial response equalization slicer, and may have a negative correlation with a sum of the signal-to-noise ratio of the zero-forcing equalization slicer and the signal-to-noise ratio of the partial response equalization slicer.

The receipt signal may be a signal on which PAM4 mapping has been executed, and the partial response equalization slicer may output the receipt signal as a symbol having seven levels.

The zero-forcing equalization may include a procedure to be processed by a Decision Feedback Equalizer.

The partial response equalization may include a procedure to be processed by a Decision Feedback Equalizer.

A communication method according to yet another aspect of the present invention includes executing zero-forcing equalization on a receipt signal, executing partial response equalization on the receipt signal, calculating a first weighted value based on signal quality of the receipt signal on which the zero-forcing equalization has been executed, calculating a second weighted value based on signal quality of the receipt signal on which the partial response equalization has been executed, and estimating a maximum likelihood sequence by supplying the first weighted value to state transition based on output from the zero-forcing equalization and supplying the second weighted value to state transition based on output from the partial response equalization.

Other features, elements, characteristics, and advantages of the present disclosure will become more apparent from the following description of preferred embodiments of the present disclosure with reference to the attached drawings.

DETAILED DESCRIPTION

(1) Configuration of Communication System

Figure 1:
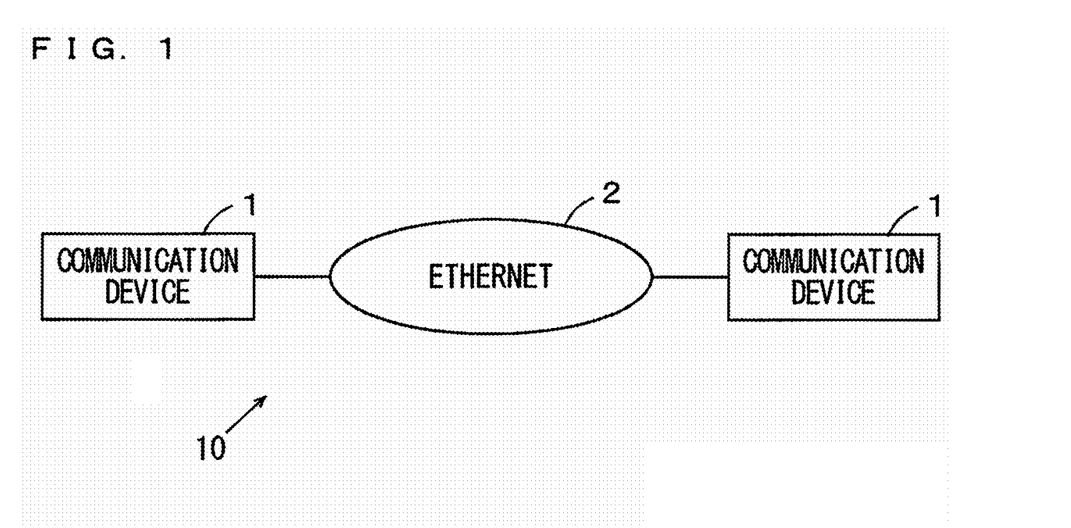
FIG. 1 is a diagram showing a communication system including a communication device according to embodiments.

A communication device and a communication method according to embodiments of the present invention will be described below in detail with reference to the drawings. FIG. 1 is a diagram showing a communication system 10 including the communication devices 1 according to the embodiments. The communication system 10 includes the plurality of communication devices 1 and Ethernet 2. The plurality of communication devices 1 are connected to be communicable with one another via the Ethernet 2. The Ethernet 2 is a communication standard defined as IEEE 802.3 and constitutes a LAN (Local Area Network). For example, 2.5G BASE-T, SG BASE-T or 10G BASE-T is used for the Ethernet 2. In regard to a physical layer of the Ethernet 2, a twisted pair cable compatible with the category 5e/6 is used in case of 2.5G BASE-T/5G BASE-T, and a twisted pair cable compatible with the category 6A is used in case of 10G BASE-T.

The communication system 10 including the communication devices 1 and the Ethernet 2 is installed in various establishments such as offices, commercial buildings and stations. Alternatively, the communication system 10 is used for personal use and used in houses, apartments, etc. Alternatively, the communication system 10 may be used in vehicles such as trains or automobiles.

(2) Schematic Configuration of Communication Device

Figure 2:
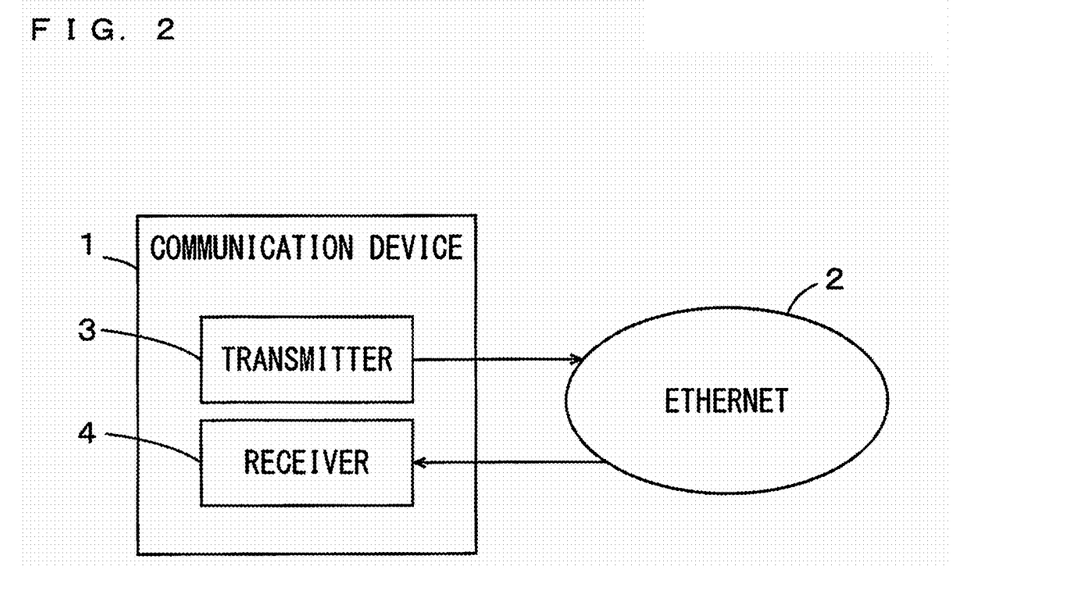
FIG. 2 is a schematic diagram showing the communication device according to the embodiments.

FIG. 2 is a schematic diagram showing the configuration of the communication device 1. The communication device 1 includes a transmitter 3 and a receiver 4. The transmitter 3 encodes a signal and transmits the encoded signal to a communication device 1 which is a counter device. The signal transmitted from the transmitter 3 is transmitted to the communication device 1 which is the counter device via the Ethernet 2. The receiver 4 receives a signal transmitted from a communication device 1 which is a counter device via the Ethernet 2.

Figure 3:
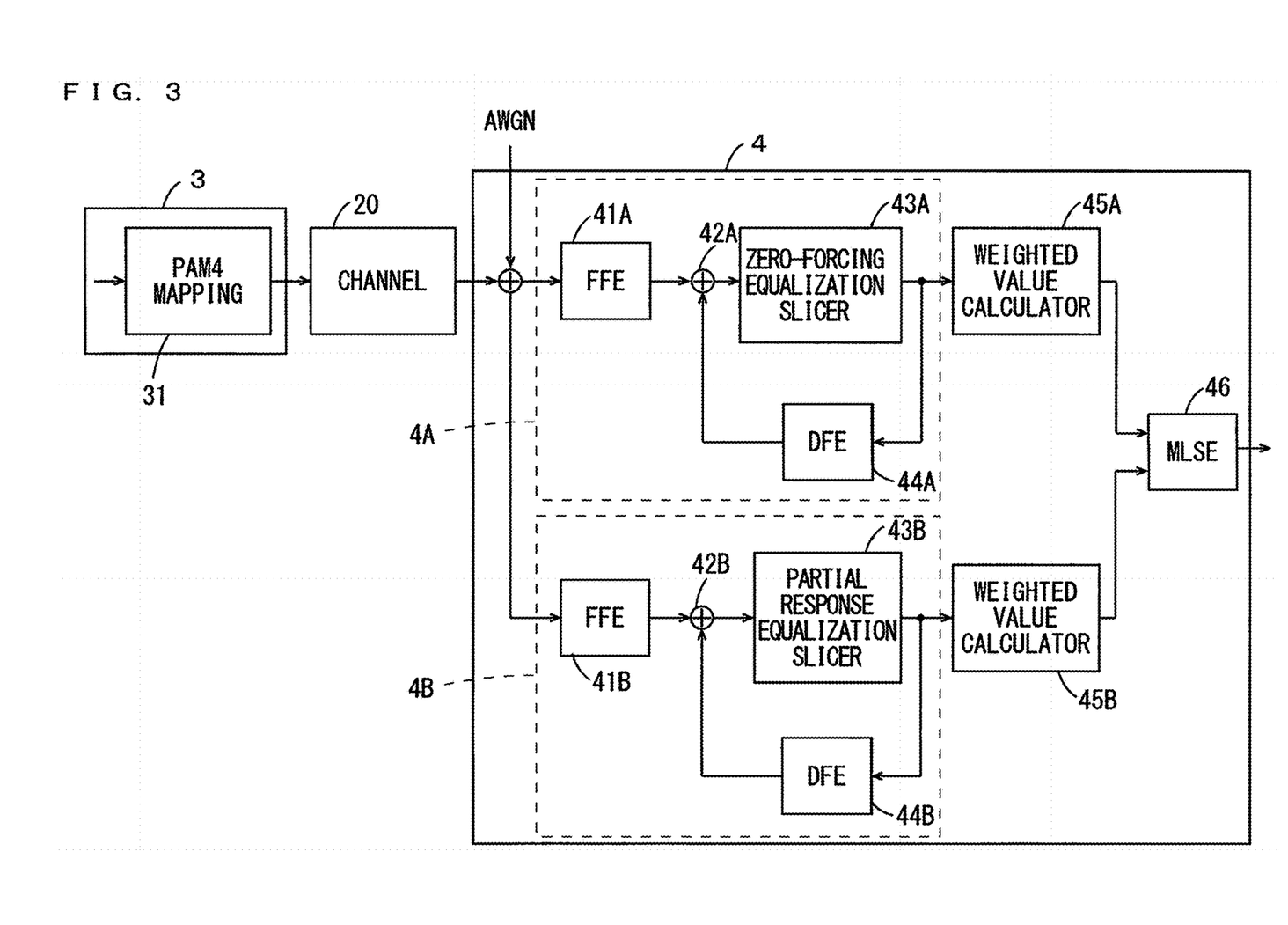
FIG. 3 is a block diagram showing the configurations of a transmitter and a receiver included in the communication device.

FIG. 3 is a block diagram showing the configuration of the transmitter 3 and the receiver 4 included in the communication device 1. As shown in FIG. 3, a receiver 4 included in one communication device 1 receives a signal transmitted by a transmitter 3 in another communication device 1 via a channel 20. The channel 20 is a transmission line between the transmitter 3 and the receiver 4. In the present embodiment, the transmission line that goes through the Ethernet 2 is the channel 20.

As shown in FIG. 3, the transmitter 3 includes a Pulse Amplitude Modulation 4-level mapper 31 (hereinafter abbreviated as a PAM4 mapper 31). The PAM4 mapper 31 maps a transmission signal into four levels—"00," "01," "10," and "11." Then, the transmitter 3 transmits the signal, which is mapped by the PAM4 mapper 31 and has four levels, using four voltage levels. Here, the transmitter 3 modulates a signal having four levels into four signal levels of $\{-1, -1/3, 1/3, 1\}$, by way of example. The transmitter 3 encodes and modulates the signal in accordance with an encoding scheme defined by IEEE 802.3ch, for example.

As shown in FIG. 3, the receiver 4 includes a zero-forcing equalizer 4A and a partial response equalizer 4B. The zero-forcing equalizer 4A executes a normal equalization process which is referred to as Zero-Forcing (ZF) for removing intersymbol interference in a received sequence. The zero-forcing equalizer 4A includes a Feed Forward Equalizer (hereinafter abbreviated as an FFE) 41A, an adder 42A, a zero-forcing equalization slicer 43A and a Decision Feedback Equalizer (hereinafter abbreviated as a DFE) 44A.

On the assumption that specific intersymbol interference is present, the partial response equalizer 4B executes an equalization process such that the output has specific partial response property. The partial response equalizer 4B includes an FFE 41B, an adder 42B, a partial response equalization slicer 43B and a DFE 44B.

The receiver 4 further includes a weighted value calculator 45A, a weighted value calculator 45B and a Maximum Likelihood Sequence Estimator (MLSE) 46. The weighted value calculator 45A is an example of a calculator calculating a first weighted value in the present invention. Further, the weighted value calculator 45B is an example of a calculator calculating a second weighted value in the present invention. Further, the Maximum Likelihood Sequence Estimator 46 is an example of an estimator in the present invention.

Figure 4:
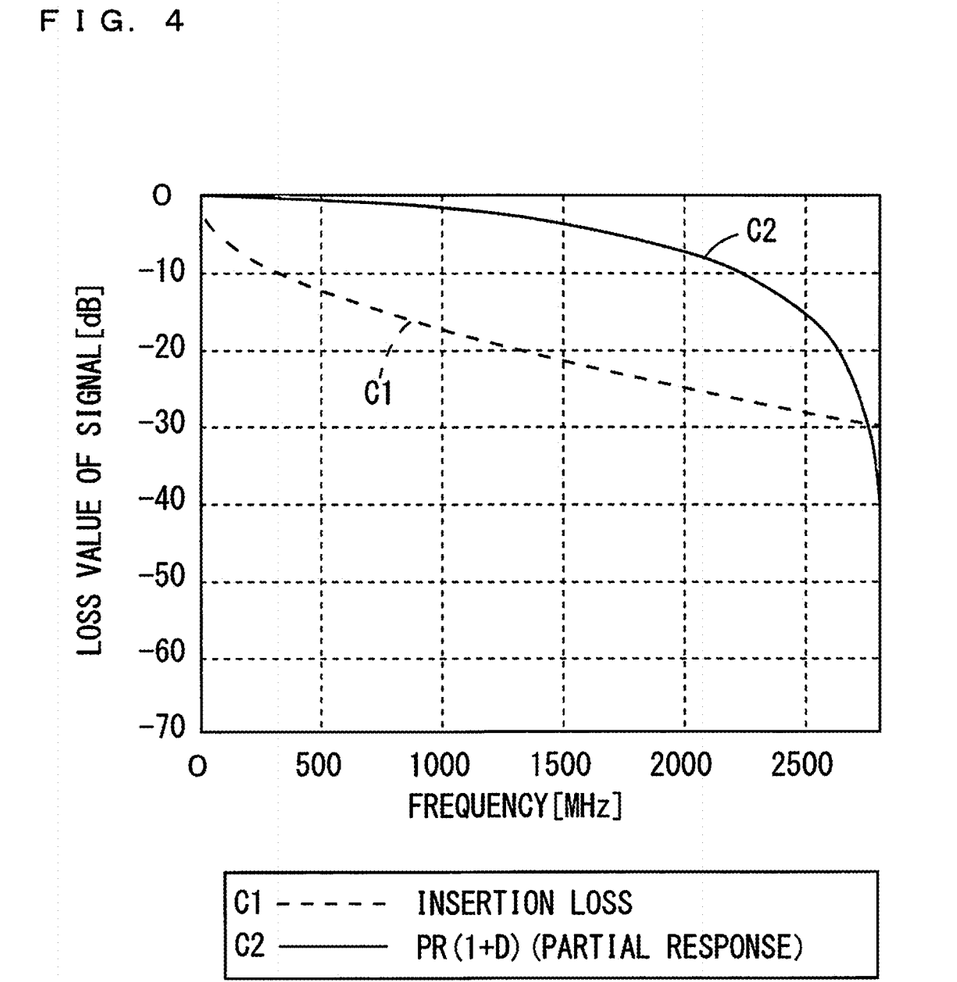
FIG. 4 is a diagram showing frequency property of a signal received via a channel.
Figure 5:
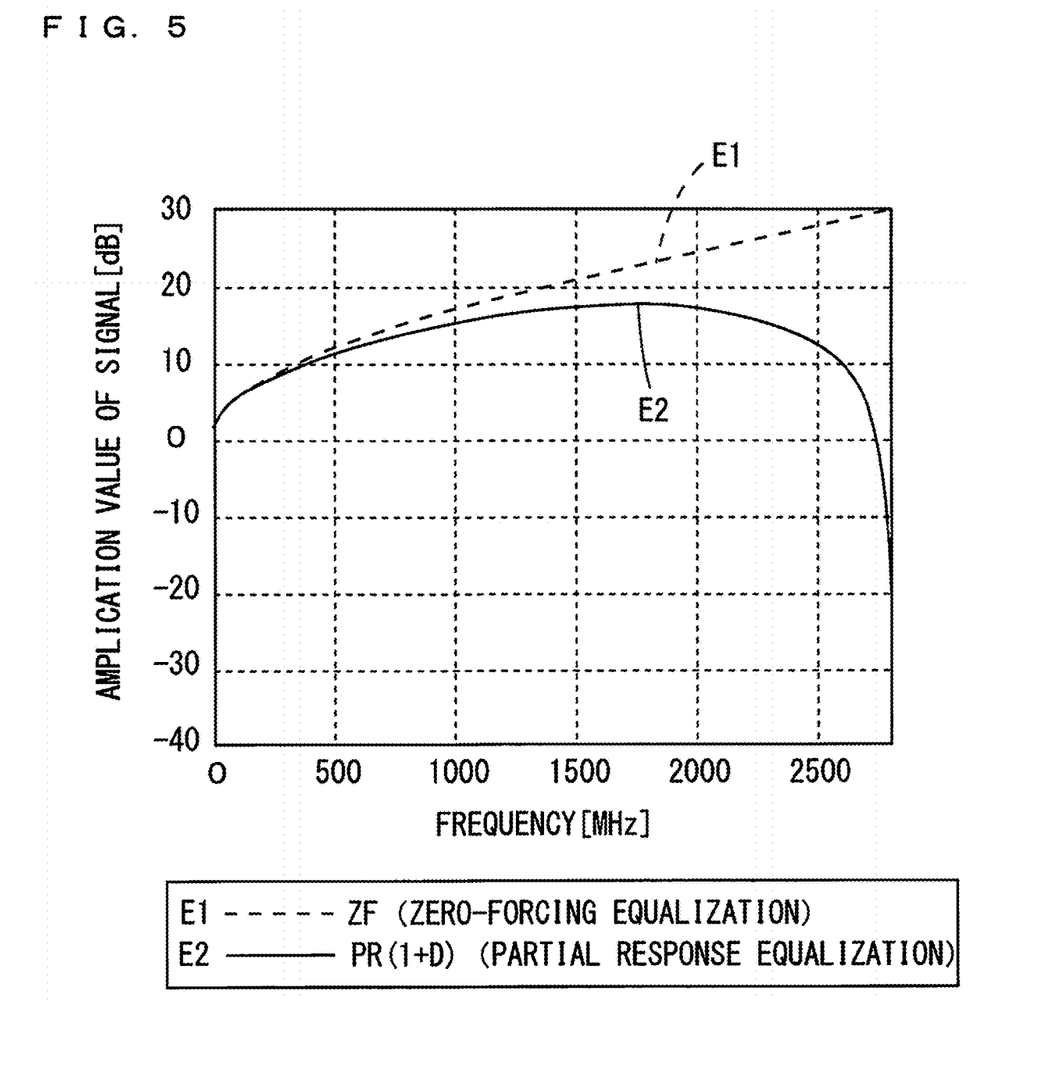
FIG. 5 is a diagram showing property of an equalizer.

(3) Zero-Forcing Equalization Process and Partial Response Equalization Process Next, a zero-forcing equalization process and a partial response equalization process to be executed by the receiver 4 in the present embodiment will be described. FIGS. 4 and 5 are diagrams for explaining the zero-forcing equalization process and the partial response equalization process. FIG. 4 is a diagram showing the frequency property of a signal received via a channel. In FIG. 4, the ordinate indicates a loss (dB) of a receipt signal, and the abscissa indicates frequency (MHz) of a receipt signal. In FIG. 4, the graph C1 indicates the frequency property of a receipt signal that has suffered insertion loss in the channel, and the graph C2 indicates the frequency property of a receipt signal that has passed through a partial response channel.

FIG. 5 is a diagram showing the property of equalizers. In FIG. 5, the ordinate indicates an amplification value (dB) of a signal, and the abscissa indicates frequency (MHz) of an amplifying signal. In FIG. 5, the graph E1 indicates the equalizer property for zero-forcing equalization of a receipt signal that has suffered insertion loss, and the graph E2 indicates equalizer property for partial response equalization of a receipt signal that has suffered insertion loss.

The graph C1 of FIG. 4 indicates the frequency property of a receipt signal in a case where the signal suffers insertion loss via the channel. In the zero-forcing equalization process, an equalization process having the property of the graph E1 of FIG. 5 is executed on a receipt signal having the property of the graph C1. After the zero-forcing equalization process, the receipt signal is amplified such that the loss is close to 0 (dB) in all frequency bands.

In contrast, in the partial response equalization process, an equalization process having the property of the graph E2 of FIG. 5 is executed on a receipt signal having the property of the graph C1. After the partial response equalization process, the receipt signal has the property similar to the property shown by the graph C2 of FIG. 4. That is, due to the partial response equalization process, the receipt signal that has suffered the insertion loss has the property of a receipt signal that has passed through the partial response channel.

(4) Specific Configuration of Receiver and Process Flow

Figure 6:
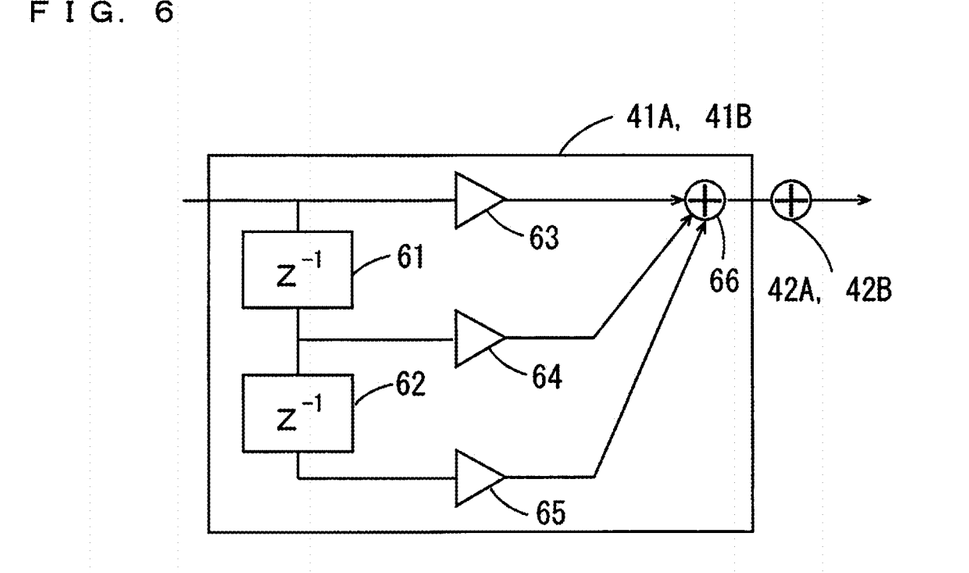
FIG. 6 is a circuit diagram showing a Feed Forward Equalizer (FFE)

Next, the specific configuration of the receiver 4 will be described while reference is made to FIG. 3 again. The FFE 41A and the FFE 41B receive a signal that has passed through the channel 20. An Additive White Gaussian Noise (AWGN) is added to the receipt signal. The FFE 41A and the FFE 41B compensate ISI (Intersymbol Interference) jitter of the channel 20 by using an FIR (Finite Impulse Response) filter. For example, an FIR filter with two taps, three taps or the like can be used as each of the FFE 41A and the FFE 41B. FIG. 6 shows one example of the circuit configuration of an FIR filter used as each of the FFE 41A and the FFE 41B. Each of the FFE 41A and the FFE 41B shown in FIG. 6 is an FIR filter with three taps and includes delayers 61, 62, multipliers 63, 64, 65 and an adder 66. A present signal is multiplied by a predetermined filter coefficient by the multiplier 63, and delay signals are multiplied by a predetermined filter coefficient by the multipliers 64, 65. The present signal and the delay signals multiplied by the filter coefficients are added to each other by the adder 66.

The adder 42A adds an output signal of the FFE 41A and an output signal of the DFE 44A to each other. The signal added by the adder 42A is input to the zero-forcing equalization slicer 43A. The adder 42B adds an output signal of the FFE 41B and an output signal of the DFE 44B to each other. The signal added in the adder 42B is input to the partial response equalization slicer 43B.

The zero-forcing equalization slicer 43A receives the sum signal of the output of the FFE 41A and the output of the DFE 44A. The zero-forcing equalization slicer 43A is a four-level slicer and outputs the signal value of a receipt signal as a symbol having four levels by comparing the signal value of the receipt signal with a threshold value. As described above, in a case where a signal transmitted by the transmitter 3 is modulated into four signal levels of $\{-1, -\frac{1}{3}, \frac{1}{3}, 1\}$, for example, the zero-forcing equalization slicer 43A outputs the signal value of the receipt signal as a symbol having the four levels of $\{-1, -\frac{1}{3}, \frac{1}{3}, 1\}$.

The partial response equalization slicer 43B receives the sum signal of the output of the FFE 41B and the output of the DFE 44B. The partial response equalization slicer 43B is a seven-level slicer and outputs the signal value of a receipt signal as a symbol having seven levels by comparing the signal value of the receipt signal with a threshold value. As described above, in a case where a signal transmitted by the transmitter 3 is modulated into four signal levels of $\{-1, -\frac{1}{3}, \frac{1}{3}, 1\}$, for example, the partial response equalization slicer 43B outputs the signal value of a receipt signal as a symbol having the seven levels of $\{-2, -\frac{4}{3}, -\frac{2}{3}, 0, \frac{2}{3}, \frac{4}{3}, 2\}$.

Figure 8:
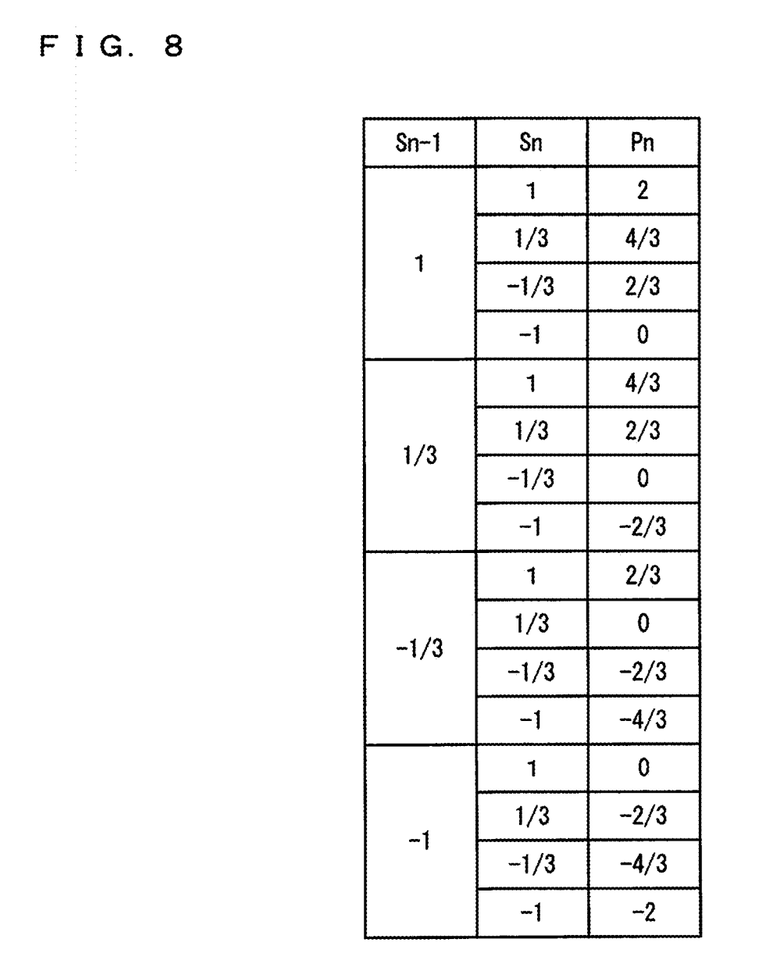
FIG. 8 is a diagram showing a signal sequence of partial response of a class PR1.

The meaning of output of the signal value of a receipt signal as a symbol having the seven levels of $\{-2, -\frac{4}{3}, -\frac{2}{3}, 0, \frac{2}{3}, \frac{4}{3}, 2\}$ by the partial response equalization slicer 43B will be described below. FIG. 8 is a diagram showing a signal sequence in partial response of a class PR1. That is, FIG. 8 is a diagram showing the signal sequence in a transmission line in which (1+D) deterioration of frequency property occurs. The transmitter 3 modulates a signal into four signal levels of $\{-1, -\frac{1}{3}, \frac{1}{3}, 1\}$ for transmission. Therefore, either of the signal sequences $\{S_{n-1}\}$, $\{S_n\}$ transmitted by the transmitter 3 has four signal levels of $\{-1, -\frac{1}{3}, \frac{1}{3}, 1\}$. The partial response $\{P_n\}$ of this signal sequence in the class PR1 has property of (1+D), thereby being a signal having seven levels of $\{-2, -\frac{4}{3}, -\frac{2}{3}, 0, \frac{2}{3}, \frac{4}{3}, 2\}$. That is, property of the receipt signal that has suffered insertion loss is equalized to property of partial response by outputting a receipt signal as a symbol having seven levels by the partial response equalization slicer 43B.

Figure 7:
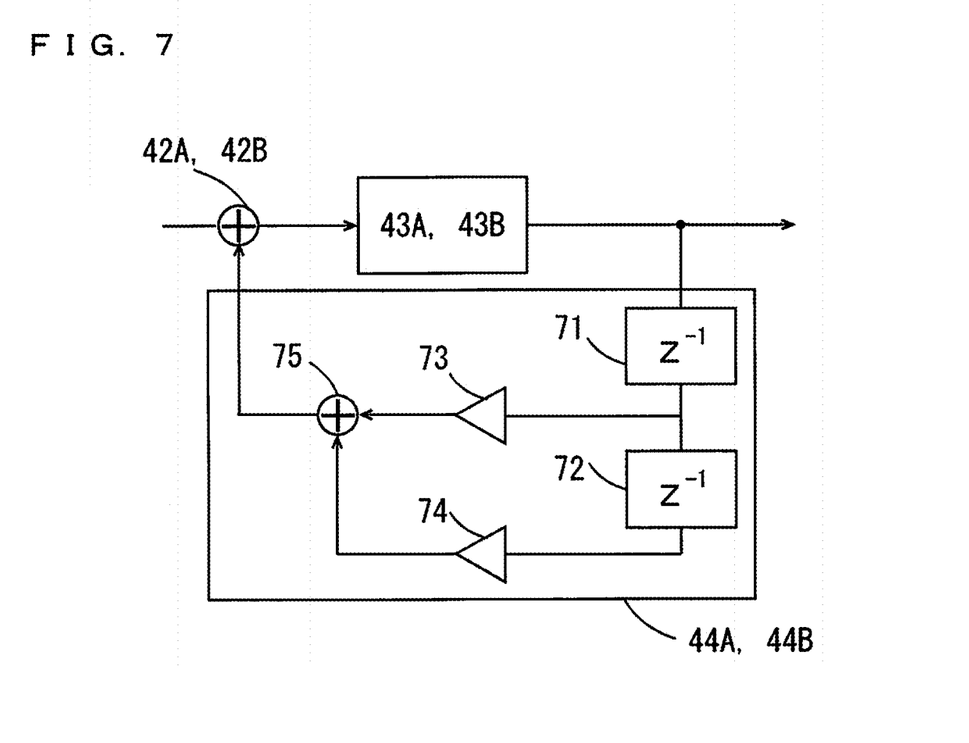
FIG. 7 is a circuit diagram showing a Decision Feedback Equalizer (DFE)

The DFE 44A receives the output from the zero-forcing equalization slicer 43A and compensates ISI jitter of the channel 20. The DFE 44B receives the output from the partial response equalization slicer 43B and compensates ISI jitter of the channel 20. Each of the DFEs 44A, 44B is a circuit that includes a delayer with multiple taps (two taps, three taps or the like) and multiplies each delay signal by a coefficient. One example of the circuit configuration of each of the DFE 44A and the DFE 44B is shown in FIG. 7. In the present embodiment, each of the DFE 44A and the DFE 44B is a DFE with two taps and includes delayers 71, 72, multipliers 73, 74 and an adder 75 as shown in FIG. 7. A delay signal is multiplied by a predetermined filter coefficient by each of the multipliers 73, 74. The delay signals multiplied by the filter coefficient are added by the adder 75.

The weighted value calculator 45A calculates a weighted value with respect to a signal output from the zero-forcing equalizer 4A. The weighted value calculator 45B calculates a weighted value with respect to a signal output from the partial response equalizer 4B. An example of calculation of a weighted value by the weighted value calculators 45A, 45B will be shown below.

Letting a signal value received by the zero-forcing equalization slicer 43A be Sn, and letting a signal value received by the partial response equalization slicer 43B be Pn. Letting an output signal determined by the zero-forcing equalization slicer 43A be Q(Sn), and letting an output signal determined by the partial response equalization slicer 43B be Q(Pn). In this case, letting a noise of the signal Sn received by the zero-forcing equalization slicer 43A be Se, and letting a noise of the signal Pn received by the partial response equalization slicer 43B be Pe, the noises Se, Pe are expressed by the formula 1 and the formula 2.

[Formula 1]

$$S_e = Q(S_n) - S_n \qquad (1)$$

[Formula 2]

$$P_e = Q(P_n) - P_n \qquad (2)$$

Letting a signal-to-noise ratio of the signal Sn received by the zero-forcing equalization slicer 43A be SNRs, and letting a signal-to-noise ratio of the signal Pn received by the partial response equalization slicer 43B be SNRp, the signal-to-noise ratios SNRs, SNRp are expressed by the formula 3 and the formula 4. As expressed by the formula 3 and the formula 4, the signal-to-noise ratio SNRs is the ratio of a value obtained by integration of the square of the signal Sn in the time direction with respect to a value obtained by integration of the square of the noise Se in the time direction. The signal-to-noise ratio SNRp is the ratio of a value obtained by integration of the square of the signal Pn in the time direction with respect to a value obtained by integration of the square of the noise Pe in the time direction.

[Formula 3]

$$SNR_s = \frac{\sum_n S_n^2}{\sum_n S_e^2} \qquad (3)$$

[Formula 4]

$$SNR_p = \frac{\sum_n P_n^2}{\sum_n P_e^2} \qquad (4)$$

The signal-to-noise ratio SNRs is an example of signal quality of the receipt signal calculated by the zero-forcing equalizer in the present invention, and the signal-to-noise ratio SNRp is an example of signal quality of the receipt signal calculated by the partial response equalizer in the present invention.

Further, letting a weighted value with respect to an output signal of the zero-forcing equalization slicer 43A be W(Sn), and letting a weighted value with respect to an output signal of the partial response equalization slicer 43B be W(Pn), W(Sn) and W(Pn) are expressed by the formula 5 and the formula 6.

[Formula 5]
$$W(S_n) = \frac{SNR_s}{SNR_s + SNR_p} \quad (5)$$

[Formula 6]
$$W(P_n) = \frac{SNR_p}{SNR_s + SNR_p} \quad (6)$$

As expressed by the formula 5, the weighted value W(Sn) has a positive correlation with the signal-to-noise ratio SNRs of the zero-forcing equalization slicer 43A, and has a negative correlation with the sum of the signal-to-noise ratio SNRs of the zero-forcing equalization slicer 43A and the signal-to-noise ratio SNRp of the partial response equalization slicer 43B. Further, as expressed by the formula 6, the weighted value W(Pn) has a positive correlation with the signal-to-noise ratio SNRp of the partial response equalization slicer 43B, and has a negative correlation with the sum of the signal-to-noise ratio SNRs of the zero-forcing equalization slicer 43A and the signal-to-noise ratio SNRp of the partial response equalization slicer 43B.

The weighted value calculators 45A, 45B calculate the weighted values W(Sn), W(Pn), respectively and supplies the calculated weighted values W(Sn), W(Pn) to the maximum likelihood sequence estimator 46. The maximum likelihood sequence estimator 46 estimates a maximum likelihood sequence based on the weighted values W(Sn), W(Pn) supplied from the weighted value calculators 45A, 45B.

Figure 9:
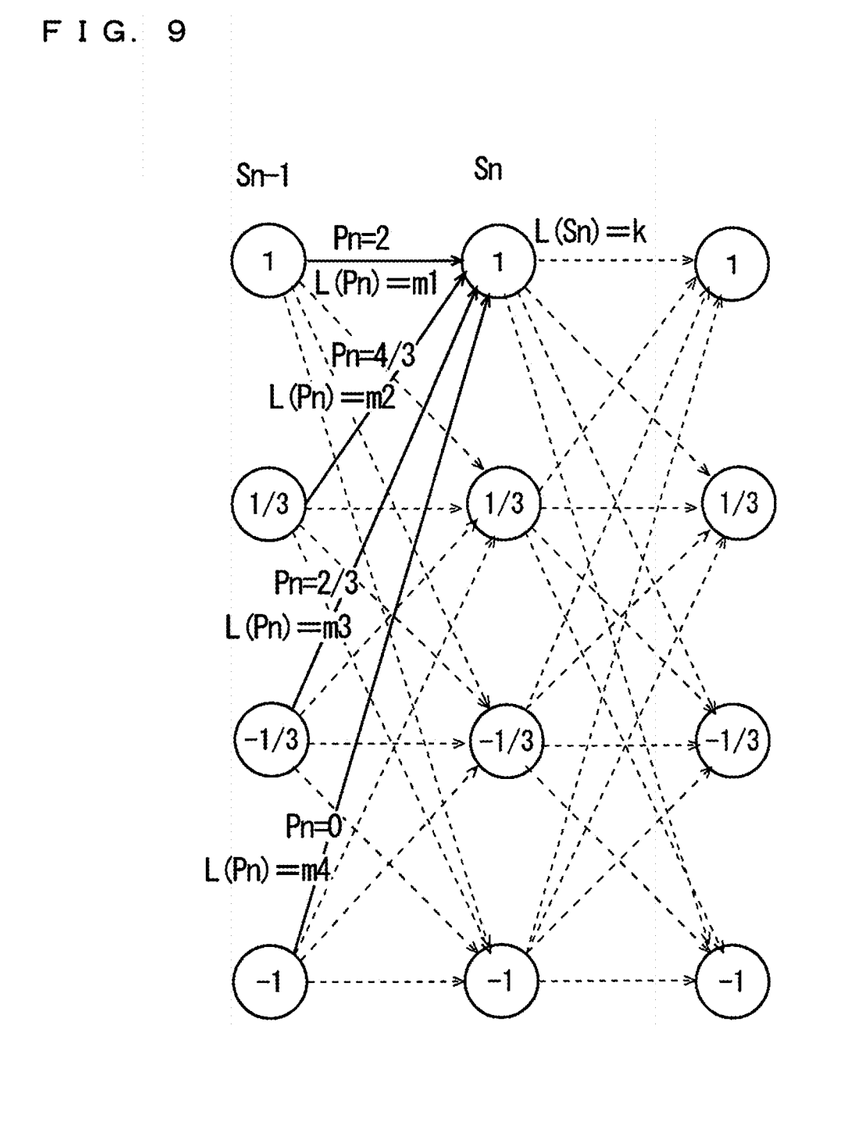
FIG. 9 is a trellis diagram to which a maximum likelihood sequence estimator refers.

FIG. 9 is a trellis diagram to which the maximum likelihood sequence estimator 46 refers. As shown in FIG. 9, a signal Sn transmitted by the transmitter 3 is a signal on which PAM4 mapping has been executed and has four levels of {−1, −⅓, ⅓, 1}. Further, a signal Pn on which partial response equalization has been executed is a signal having seven levels of {−2, −4/3, −⅔, 0, ⅔, 4/3, 2}.

Here, as a result of estimation by the maximum likelihood sequence estimator 46, in a case where Sn=1, a likelihood is expressed by L(Sn)=k. Further, a likelihood in which a state is Pn=2 is expressed by L(Pn)=m1. A likelihood in which a state is Pn=4/3 is expressed by L(Pn)=m2. A likelihood in which a state is Pn=⅔ is expressed by L(Pn)=m3. A likelihood in which a state is Pn=0 is expressed by L(Pn)=m4. As shown in FIG. 8, in a case where Pn=2 in a sequence, Sn−1=1, Sn=1. In a case where Pn=4/3 in a sequence, Sn−1=⅓, Sn=1. In a case where Pn=⅔ in a sequence, Sn−1=−⅓, Sn=1. In a case where Pn=0 in a sequence, Sn−1=−1, Sn=1.

In this case, the weighted likelihood LW(Pn) of transition a state of which is Pn=2 is expressed by the formula 7 with use of the weighted values W(Sn), W(Pn). Similarly, the weighted likelihood LW(Pn) of transition a state of which is Pn=4/3, ⅔ or 0 is expressed by the formula 8 to the formula 10 with use of the weighted values W(Sn), W(Pn).

[Formula 7]
Weighted likelihood in which a state is $P_n$=2.
$$LW(P_n)=L(S_n)*W(S_n)+L(P_n)*W(P_n)=k*W(S_n)+m1*W(P_n) \quad (7)$$

[Formula 8]
Weighted likelihood in which a state is $P_n$=4/3.
$$LW(P_n)=k*W(S_n)+m2*W(P_n) \quad (8)$$

[Formula 9]
Weighted likelihood in which a state is $P_n$=⅔.
$$LW(P_n)=k*W(S_n)+m3*W(P_n) \quad (9)$$

[Formula 10]
Weighted likelihood in which a state is $P_n$=0
$$LW(P_n)=k*W(S_n)+m4*W(P_n) \quad (10)$$

The maximum likelihood sequence estimator 46 calculates a weighted likelihood Lw(Pn) in regard to each transition in the trellis diagram with use of the weighted values W(Sn), W(Pn). Further, the maximum likelihood sequence estimator 46 estimates the transition that has the largest weighted likelihood LW(Pn) as a maximum likelihood sequence. The maximum likelihood sequence 46 estimates a maximum likelihood sequence with use of algorithm such as a viterbi algorithm. While a likelihood is expressed by L(Sn)=k in a case where Sn=1 in the above-mentioned example, a weighted likelihood LW(Pn) is calculated, and a maximum likelihood sequence is estimated by the similar method also in a case where Sn=⅓, −⅓, −1.

In this manner, the communication device 1 of the present embodiment includes a weighted value calculator 45A that calculates a weighted value W(Sn) based on the signal quality of a receipt signal output from the zero-forcing equalizer 4A and a weighted value calculator 45B that calculates a weighted value W(Pn) based on the signal quality of a receipt signal output from the partial response equalizer 4B. Further, the maximum likelihood sequence estimator 46 of the communication device 1 supplies a weighted value W(Sn) to the state transition based on the output of the zero-forcing equalizer 4A and supplies a weighted value W(Pn) to the state transition based on the output of the partial response equalizer 4B, thereby estimating a maximum likelihood sequence. Thus, the communication device 1 of the present embodiment can weight the signal obtained by zero-forcing equalization and partial response equalization in accordance with property of a transmission line for utilization. Thus, a symbol error rate in the communication device 1 can be lowered.

Figure 10:
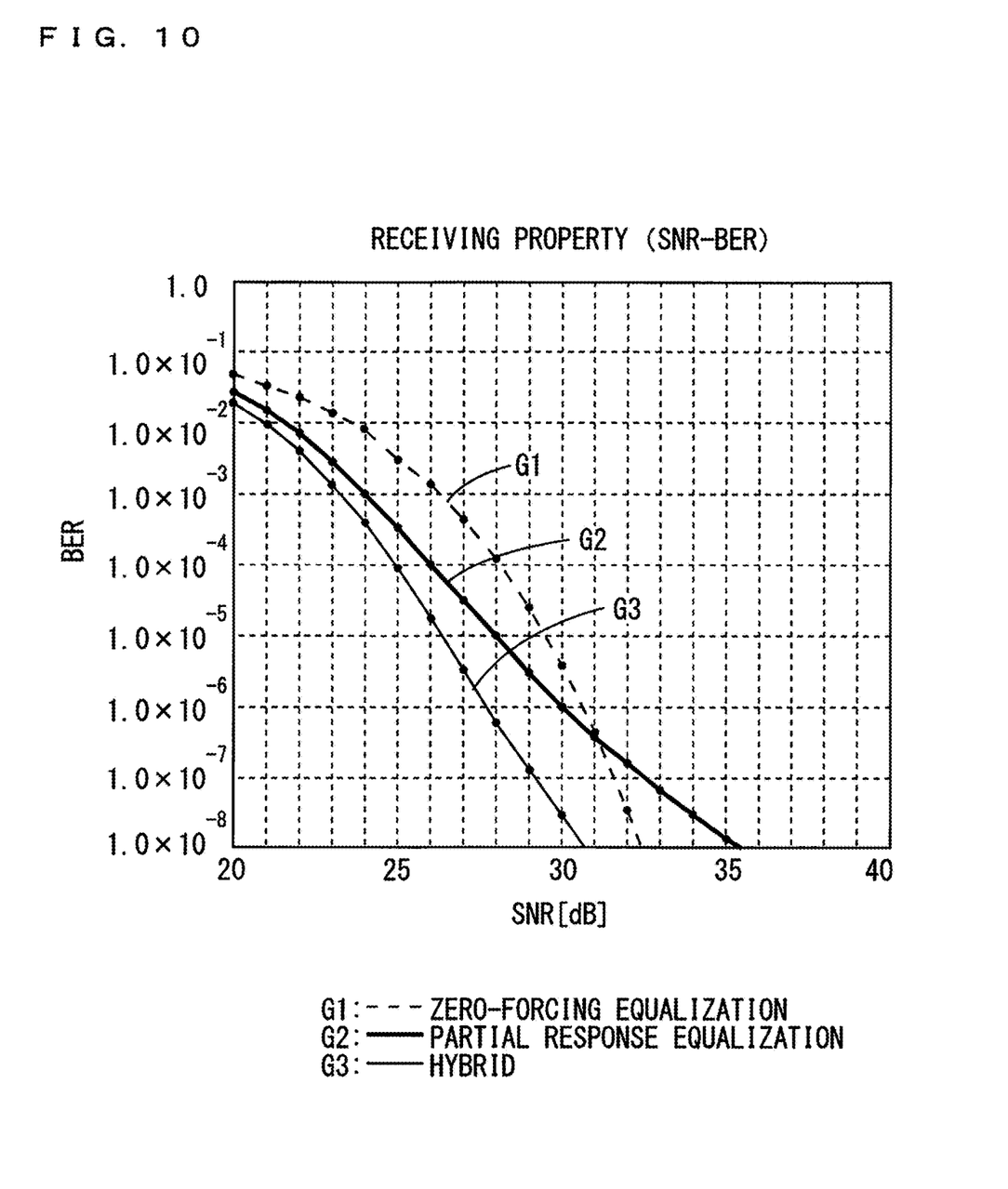
FIG. 10 is a diagram showing a result of experiment in which receiving property is compared between the communication device according to the embodiment and a conventional communication device.

FIG. 10 is a diagram showing a result of experiment in which receiving property is compared between the communication device 1 according to the embodiment and a conventional communication device. In FIG. 10, the graph G1 represents the relationship between the signal-to-noise ratio of a receipt signal and the symbol error rate in a case where a conventional zero-forcing equalization process is utilized. The graph G2 represents the relationship between the signal-to-noise ratio of a receipt signal and the symbol error rate in a case where a conventional partial response equalization process is utilized. The graph G3 represents the relationship between the signal-to-noise ratio of a receipt signal and the symbol error rate in a case where the communication device 1 in the present embodiment is utilized, that is, in a case where the hybrid configuration of the zero-forcing equalization process and the partial response equalization process is utilized. All of the graphs G1 to G3 represent data acquired in the environment of 10G BASE-T. As shown in FIG. 10, the communication device 1 of the present embodiment can realize a similar symbol error rate even in a case where a signal-to-noise ratio is lower than a signal-to-noise ratio acquired in a zero-forcing equalization process by about 2 to 3 db and is lower than a signal-to-noise ratio acquired in a partial response equalization process by about 1 to 2 dB.

(5) Other Embodiments

In the above-mentioned embodiment, since the property of the class PR1(1+D) is the most similar to the property of insertion loss, the partial response equalizer 4B executes partial response equalization of the class PR1, by way of example. In another embodiment, a partial response equalizer 4B may be configured to execute partial response equalization corresponding to other classes (PR2 to PR5, etc.)

In the above-mentioned embodiment, the zero-forcing equalizer 4A is configured to include the DFE 44A, and the partial response equalizer 4B is configured to include the DFE 44B. In another embodiment, a zero-forcing equalizer 4A may be configured not to include a DFE. A partial response equalizer 4B may be configured not to include a DFE.

In the above-mentioned embodiment, the weighted value calculators 45A, 45B calculate the weighted values W(Sn), W(Pn) each time based on a signal-to-noise ratio SNRs of the signal Sn received by the zero-forcing equalization slicer 43A and a signal-to-noise ratio SNRp of the signal Pn received by the partial response equalization slicer 43B. In another embodiment, several expected values may be stored in a table in advance, and an appropriate expected value may be set as a weighted value in accordance with the state of a transmission line.

In the above-mentioned embodiment, the PAM4 mapping is executed on a transmission signal by way of example. The communication device 1 of the present embodiment can be applied to other modulation systems such as PAM2, PAM3, PAM5, PAM8, PAM16 and NRZ.

"The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor."

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A communication device comprising:
circuitry configured to:
receive a receipt signal and execute zero-forcing equalization on the receipt signal;
receive the receipt signal and execute partial response equalization on the receipt signal;
calculate a first weighted value based on signal quality of the receipt signal on which the zero-forcing equalization has been executed:
calculate a second weighted value based on signal quality of the receipt signal on which the partial response equalization has been executed; and
estimate a maximum likelihood sequence by supplying the first weighted value to state transition based on output from the zero-forcing equalization and supplying the second weighted value to state transition based on output from the partial response equalization.

2. The communication device according to claim 1, wherein
the zero-forcing equalization includes a procedure to be processed by a zero-forcing equalization slicer,
the partial response equalization includes a procedure to be processed by a partial response equalization slicer, and
the calculating a first weighted value includes calculating the first weighted value based on a signal-to-noise ratio of the zero-forcing equalization slicer, and the calculating a second weighted value includes calculating the second weighted value based on a signal-to-noise ratio of the partial response equalization slicer.

3. The communication device according to claim 2, wherein
the first weighted value
has a positive correlation with the signal-to-noise ratio of the zero-forcing equalization slicer, and
has a negative correlation with a sum of the signal-to-noise ratio of the zero-forcing equalization slicer and the signal-to-noise ratio of the partial response equalization slicer, and
the second weighted value has a positive correlation with the signal-to-noise ratio of the partial response equalization slicer, and
has a negative correlation with a sum of the signal-to-noise ratio of the zero-forcing equalization slicer and the signal-to-noise ratio of the partial response equalization slicer.

4. The communication device according to claim 1, wherein
the receipt signal is a signal on which pulse amplitude modulation 4 (PAM-4) mapping has been executed, and the partial response equalization slicer outputs the receipt signal as a symbol having seven levels.

5. The communication device according to claim 1, wherein
the zero-forcing equalization includes a procedure to be processed by a decision feedback equalizer.

6. The communication device according to claim 1, wherein
the partial response equalization includes a procedure to be processed by a decision feedback equalizer.

7. A communication method including:
executing zero-forcing equalization on a receipt signal;
executing partial response equalization on the receipt signal;
calculating a first weighted value based on signal quality of the receipt signal on which zero-forcing equalization has been executed;

calculating a second weighted value based on signal quality of the receipt signal on which partial response equalization has been executed; and estimating a maximum likelihood sequence by supplying the first weighted value to state transition based on output from the zero-forcing equalization and supplying the second weighted value to state transition based on output from the partial response equalization.

* * * * *